United States Patent
Barndt (10) Patent No.: US 6,275,350 B1
(45) Date of Patent: Aug. 14, 2001

(54) MAGNETIC HEAD AND METHOD FOR COMPENSATING FOR MAGNETIC TAPE DIMENSIONAL INSTABILITY

(75) Inventor: Richard D. Barndt, Fremont, CA (US)

(73) Assignee: Hewlett-Packard Company, Palo ALto, CA (US)

(*) Notice: Subject to any disclaimer, the term of this patent is extended or adjusted under 35 U.S.C. 154(b) by 0 days.

(21) Appl. No.: 09/054,648

(22) Filed: Apr. 3, 1998

(51) Int. Cl.$^7$ .................................................. G11B 5/584
(52) U.S. Cl. ........................................ 360/77.12; 360/121
(58) Field of Search .................................. 360/121, 119, 360/125, 75, 60, 77.01, 77.12, 77.13, 25, 31

(56) References Cited

U.S. PATENT DOCUMENTS

| | | |
|---|---|---|
| 2,736,775 | 2/1956 | Camras . |
| 5,008,765 * | 4/1991 | Youngquist ........................ 360/121 X |
| 5,257,148 | 10/1993 | Solhjell et al. ..................... 360/77.06 |
| 5,289,328 * | 2/1994 | Salaba ................................. 360/121 |
| 5,371,638 | 12/1994 | Saliba ............................... 360/77.12 |
| 5,392,170 | 2/1995 | Solhjell ................................ 360/63 |
| 5,436,780 * | 7/1995 | Nagata et al. ....................... 360/121 |
| 5,600,505 | 2/1997 | Ayres ................................ 360/77.12 |
| 5,978,188 * | 11/1999 | Kaaden et al. .................... 360/121 X |

FOREIGN PATENT DOCUMENTS

| | | |
|---|---|---|
| 0617424A | 9/1997 | (EP) . |
| 60-98524 * | 6/1985 | (JP) . |
| 11-283234 * | 10/1999 | (JP) . |
| 9725710A | 7/1997 | (WO) . |

* cited by examiner

Primary Examiner—Andrew L. Sniezek (57) ABSTRACT

A multi-transducer magnetic head includes an array of transducer pairs positioned across at least a portion of a cross section of a magnetic tape path. Each transducer pair includes at least one write transducer and at least one read transducer. Within each transducer pair, a first centerline through the write transducer is generally parallel to a second centerline through the read transducer. Distances between the first and second centerlines within individual transducer pairs increase with distances of the transducer pairs from a head position reference point. In the preferred embodiment, the write transducers have a first pitch and the read transducers have a second pitch. However, the read transducers are biased toward the head position reference point, so that the pitch of the read transducers is smaller than the pitch of the write transducers. The method of determining the positions of the read and write transducers includes (1) dividing the sources of transducer-to-track alignment errors into biased and non-biased sources, (2) calculating preferred margins to compensate for the non-biased sources, and (3) laterally biasing the read transducers, the write transducers, or both to compensate for the biased sources.

13 Claims, 6 Drawing Sheets

MAGNETIC HEAD AND METHOD FOR COMPENSATING FOR MAGNETIC TAPE DIMENSIONAL INSTABILITY

TECHNICAL FIELD

The invention relates generally to positioning magnetic heads in magnetic storage devices used for data storage and retrieval, and relates more particularly to the positioning of the magnetic heads to compensate for transducer-to-tape alignment errors caused by dimensional instability of the tape.

DESCRIPTION OF THE RELATED ART

Magnetic tape data storage devices are used to backup data stored on non-removable disk drives in computers, so that data will not be lost in the event of an operator or electrical error, or a mechanical failure. The use of magnetic tape data storage devices is commonplace, since the cost per unit of stored data is low compared to other forms of electronic data storage. Due to the increasing density and volume of data stored on non-removable disk drives, there is an increasing need for tape data storage devices that provide greater data storage capacity and higher data transfer rates. To satisfy the requirement for data storage, higher track densities on the magnetic tape are sought. To satisfy the need for higher transfer rates, magnetic heads that have multiple read and write transducers which operate simultaneously are used.

There are a number of factors that must be considered in determining the maximum tape track density of a storage device, including the need to compensate for data track alignment errors caused by small manufacturing variations in the tape storage devices or caused by environmental factors that affect the dimensional stability of the tape. Dimensional changes affect the relative position of a magnetic head and data tracks on the tape. Dimensional changes in tape, particularly for tape formed using polymer substrates, such as the commonly used PET (polyethylene terephthalate) substrate, are generally a function of temperature, humidity and the internal structure of the tape. Many kinds of tape have been found to shrink over the useful life of the tape, as a function of age. Compensating for dimensional instability of tape has become more stringent as track densities increase.

For purposes of recording and reading numerous tracks simultaneously, many prior art magnetic tape data storage devices use multi-transducer heads that extend across all or a significant portion of the width of the tape. In such devices, fabrication difficulties and physical limits often require that the individual transducers on the multi-transducer head must be separated by significantly more than the width of a single track.

Figure 1:
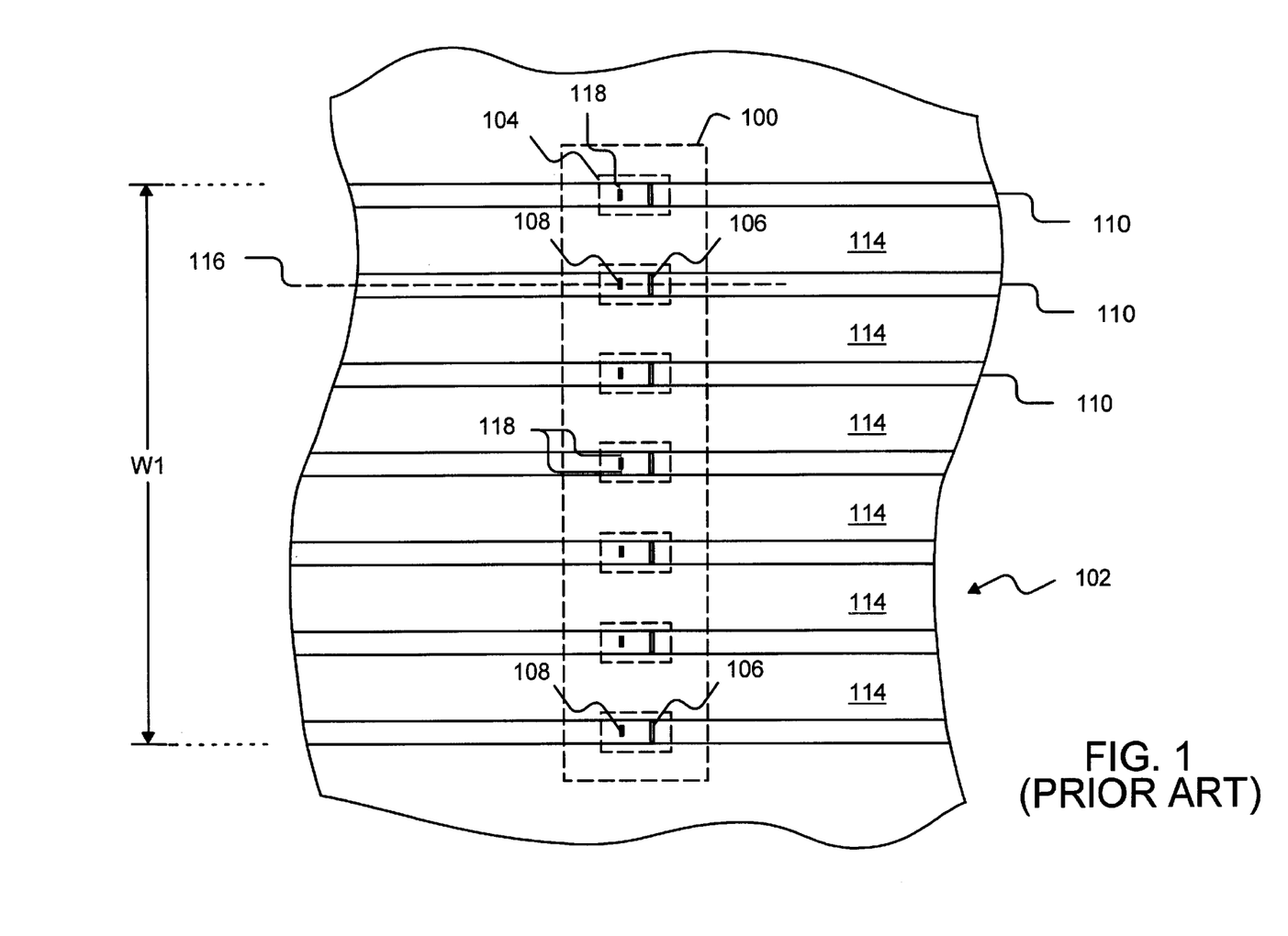
FIG. 1 is a side view of a multi-transducer magnetic head positioned adjacent to a magnetic tape prior to any age-related shrinkage following the recording of data in data tracks.

Referring to FIG. 1 (Prior Art), a conventional configuration of a multi-transducer magnetic head 100 is shown as extending over a portion of the width of a magnetic tape referenced by the number 102 and addressed by the magnetic head. The portion of the tape 102 shown has a width of W1, which is the width prior to any age related shrinkage. A number of transducer pairs 104 are arrayed along the magnetic head 100. Each transducer pair 104 includes one write transducer 106, which has a length approximately as wide as the data track 110, and one read transducer 108, which is spaced apart from the write transducer along the longitudinal axis of the tape. The read transducer has a length that is less than the length of the write transducer 106 in order to provide a margin 118 on each side of the read transducer 108. The difference in the lengths of the two transducers within each pair 104 is intended to compensate for sources of track alignment error, including some tolerance for age-related tape shrinkage.

A number of data tracks 110 are shown, with one data track 110 being located beneath each of the transducer pairs 104. Each data track 110 has a centerline 116 that is aligned with centerlines passing through a read transducer 108 and a corresponding write transducer 106. The direction of motion of the tape 102 is from right to left. In the spaces between the data tracks 110, currently unaccessed regions 114 exist and are available for subsequently formed tracks. Separate electronic channels for the read and write transducers permit control of simultaneous read and write operations. Simultaneous read and write operations are used to confirm that data recorded on tape 102 by a write transducer is accessible by a read transducer. The position of the transducer pairs 104 relative to the tape 102 is shown in FIG. 1 before any age-related shrinkage has occurred. The pitch of the adjacent read transducers 108 is consistent through the entire transducer array. Similarly, the pitches of the write transducers 106 and the data tracks 110 are consistent. The term "pitch" is defined herein as the center-to-center spacing between adjacent elements.

Figure 2:
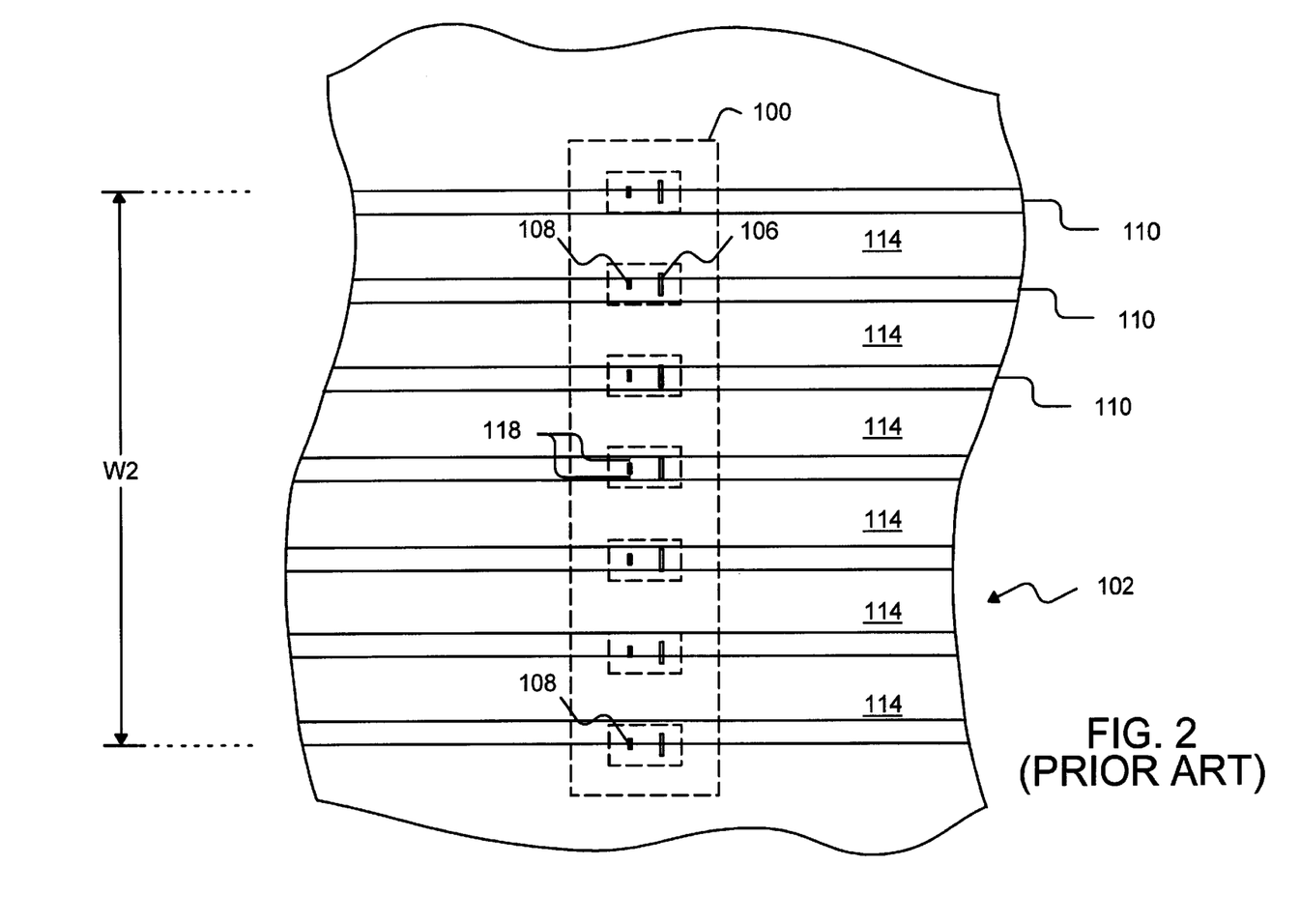
FIG. 2 is a side view of the prior art magnetic head of FIG. 1 positioned adjacent to the magnetic tape following age-related shrinkage.

The width of the multi-transducer head 100 and the width of the magnetic tape may be more than one hundred times the width of an individual data track 110. Therefore, shrinkage of only a few tenths of a percent in the width of a tape can cause the spacing between recorded data tracks 110 to change sufficiently, relative to the spacing at the time that the tracks were recorded, potentially causing a track misalignment between read transducers 108 of the magnetic head 100 and the data track 110 intended to be read. In FIG. 2 (Prior Art) the width of the portion of the tape 102 has a reduced width W2, as compared to the original width W1 of FIG. 1. As shown in FIG. 2, shrinkage may cause some of read transducers 108 to extend significantly beyond the data tracks 110 to be read. If age-related shrinkage is not compensated for, or is insufficiently compensated for, the read transducers 108 of the outermost transducer pairs 104 will no longer align with the data tracks 110 sufficiently to enable the read transducers to reliably read the stored data.

Servo tracking techniques have been developed to reduce the effects of tracking error and thus increase the possible track density of tape systems. Known servo tracking techniques vary widely, but most involve methods of dynamically moving the magnetic head to reposition the transducers over the correct data tracks. However, such servo mechanisms are not necessarily effective in compensating for age-related shrinkage when used on conventional multi-transducer heads because simultaneous alignment of the outermost transducers over the appropriate data tracks may be prevented after tape shrinkage. For example, after shrinkage, the distance between the outermost tracks read by the magnetic head will be less than the distance between the outermost read transducers. Thus, displacing the read transducers on one end of a head to align with the appropriate data tracks will displace the read transducers on the opposite end of the head away from alignment with the appropriate data tracks. Consequently, servo tracking conventional heads does not directly address the adverse effects of dimensional instabilities of magnetic tapes.

What is needed is a magnetic head and transducer arrangement and method which allow the use of multi-transducer magnetic heads for simultaneously writing and reading an array of data tracks of a data storage tape and which have read transducers positioned to compensate for age-related dimensional tape instabilities.

SUMMARY OF THE INVENTION

A magnetic head and transducer arrangement and method include providing a progressive offset of a position of a read transducer relative to a corresponding write transducer in an array of transducer pairs. More specifically, a distance between a centerline through a read transducer and a centerline through a write transducer of the same pair will be greater with the distance of the pair from a head positioning reference point on the magnetic head. While not critical, the head positioning reference point is preferably along a track-following plane that is defined by operation of a servo mechanism.

In one embodiment, the array of transducer pairs is fixed to a magnetic head that extends across at least a portion of the width of a magnetic tape. In a preferred embodiment, the head positioning reference point is located in the center of the magnetic head, but this is not critical. In each direction from the head positioning reference point, the centerlines of the read and write transducers of pairs are spaced apart by a distance that is at least partially determined by the distance of the pairs from the head positioning reference point.

The offset is designed to compensate for age-related shrinkage of the magnetic tape. Therefore, the read transducers are biased closer to the head positioning reference point than the write transducers. If shrinkage occurs following a write operation in which the write transducers record data within data tracks, the shrinkage laterally displaces the centerlines of the data tracks away from the centerlines of the write transducers, but toward the centerlines of the read transducers. One basis of the invention is the recognition of the difference between age-related sources of alignment errors, which begin at a negligible value and increase at a reasonably predictable rate over time (referred to herein as "biased sources" of alignment errors), and other sources of alignment errors that can be generally described as distributed in a probability curve about a mean value that is typically zero (referred to herein as "non-biased sources" of alignment errors).

The progressive offset can be implemented in at least three embodiments. In each embodiment, the read transducers are preferably uniformly spaced and the write transducers are preferably uniformly spaced, i.e., the centerlines through the write transducers and the centerlines through the read transducers each have a constant pitch. However, The distance ($\delta_\kappa$) between centerlines of read and write transducers of a particular transducer pair ($\kappa$) increases with distance from the head positioning reference point. In the first embodiment, this is accomplished by biasing the read transducers towards the head positioning reference point. In a second embodiment, this is accomplished by biasing the write transducers away from the head positioning reference point. In a third embodiment, this is accomplished by both biasing the read transducers towards the head positioning reference point and biasing the write transducers away from the head positioning reference point.

The preferred embodiment is one in which the magnetic head that contains the array of transducer pairs extends across only a portion of the width of the magnetic tape. However, the invention may be used with magnetic heads that span the entire width of the tape. If only a portion of the tape is spanned, the magnetic head is preferably laterally displaceable, so that the array of transducer pairs is able to read different sets of data tracks, depending upon the position of the magnetic head. The head positioning reference point is used as a reference for positioning the magnetic head over the magnetic tape, so that the transducers address the desired data tracks. The distance ($\delta_\kappa$) between centerlines of read and write transducers of a particular transducer pair ($\kappa$) may be based upon compensating for a fixed percentage (m) of an amount (S) of anticipated change in magnetic tape width divided by an original magnetic tape width (i.e., $\Delta$ width/original width).

The distance ($\delta_\kappa$) may then be calculated as follows:

$$\delta_\kappa = m(S)(C-Wr_k)$$

where C is the distance of the head positioning reference point H from a predetermined reference point P on a Y axis that extends perpendicular to the magnetic tape path and where $Wr_\kappa$ is the distance of the write transducer $\kappa$ from the predetermined reference point P. As previously noted, the head positioning reference point H is preferably located along a track-following plane at the center of the magnetic head or transducer array, and the location of reference point P preferably coincides with the reference point H, so that C=0. Also in the preferred embodiment, the percentage m is 50 percent, so that the distance $\delta_\kappa = \frac{1}{2}(S)(-Wr_\kappa)$.

The preferred embodiment compensates for only the portion m of the amount S of the anticipated fractional change in width, since the bias of the relative positions of the read transducers and the write transducers creates a small loss in tolerance of non-biased sources of alignment error prior to the shrinkage of the magnetic tape due to aging. However, a significant long-term gain is made in tolerance to the age-related shrinkage. Furthermore, the tolerance to non-biased sources of alignment error increases as the tape decreases in width to a maximum tolerance when the tape has reached m of $\Delta$ width/original width.

A first step in carrying out the invention is to establish a location of the head positioning reference point H, and a write head length. If a servo mechanism is utilized during read operations, the reference point H is preferably selected based upon the servo operation. A next step is to divide the sources of transducer-to-track alignment errors into biased and non-biased sources. The length of the read transducer is selected to at least partially compensate for the non-biased sources of track alignment error, thus the read transducers have a length that is less than that of the write transducers. Age-related shrinkage is then considered. Compensation is at least partially provided by adjusting the positions of the read transducers relative to the write transducers. Typically, this involves biasing each read transducer towards the head positioning reference point H by a distance related to the distance of the associated write transducer from the magnetic head positioning reference point H. This increases the distance between centerlines through the write and read transducers of a transducer pair, causing the margin on one side of the read transducer to be larger than the other.

DETAILED DESCRIPTION

Figure 3:
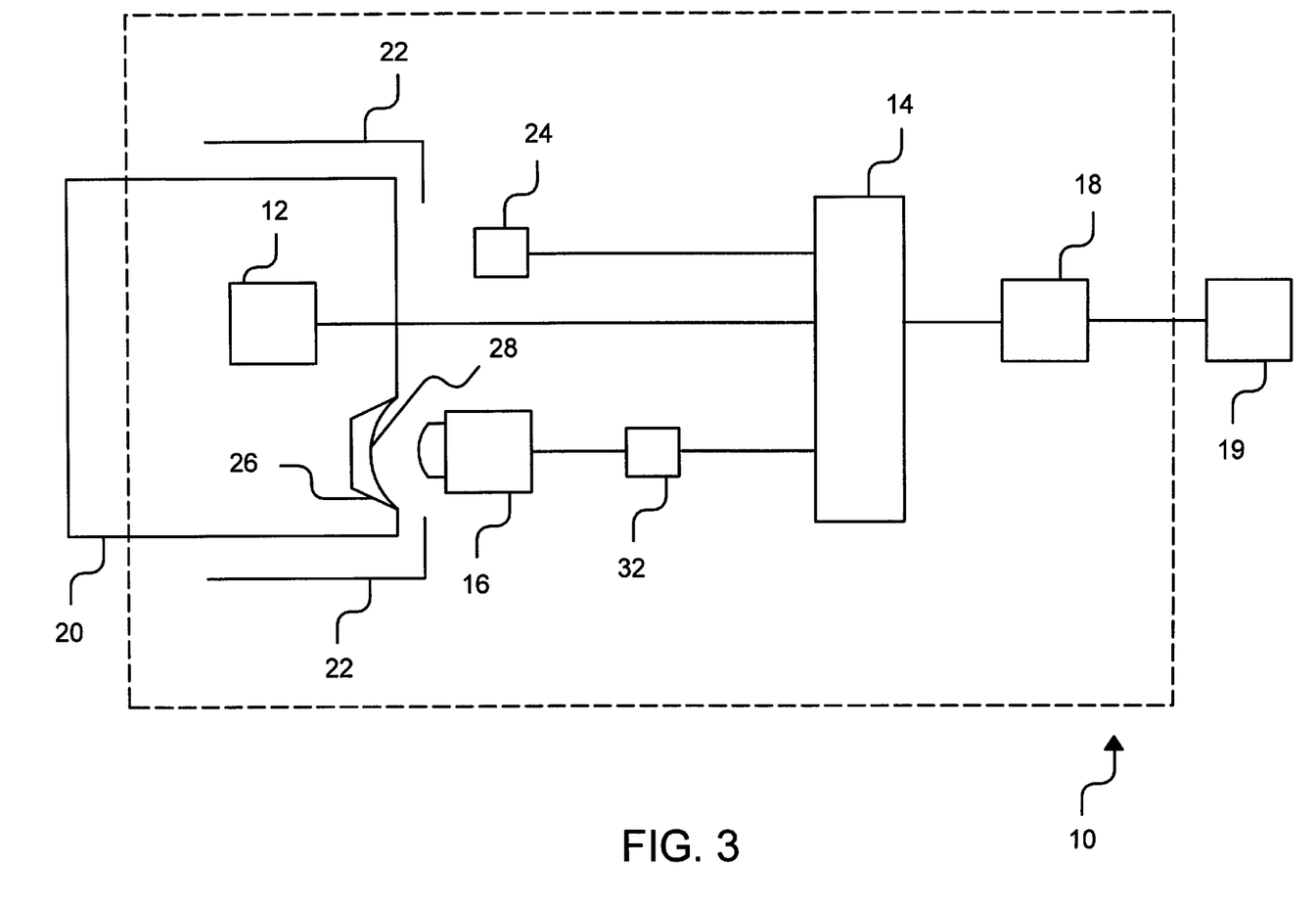
FIG. 3 illustrates a typical configuration of a magnetic data storage device incorporating the magnetic head of the invention.

With reference to FIG. 3, a magnetic tape data storage device is shown as including a magnetic head 16 that includes an offset of a read transducer relative to a write transducer in accordance with the invention to be described below. The particular configuration of the magnetic tape data storage device is not critical to the invention. The configuration shown in FIG. 3 is provided as an example, and the magnetic head 16 may be incorporated in other magnetic storage device configurations. The storage device 10 includes a tape drive mechanism 12, a drive controller 14, and an interface controller 18. The drive controller 14 operates the tape drive mechanism 12 to move tape in either a forward or rearward direction at a tape speed that is within specified limits.

A conventional magnetic tape data storage cartridge 20 is shown coupled to the storage device 10. A positioning structure 22 fixes the cartridge 20 in a desired position for proper interface with the storage device. A cartridge sensor 24 detects the presence of the cartridge and signals the drive controller 14. The drive controller actuates the drive mechanism 12 to provide tape movement at a proper speed. The housing of the cartridge includes a magnetic head-receiving notch 26 that allows the magnetic head 16 to abut data storage tape 28. As is well known in the art, the magnetic head 16 includes an array of write transducers and read transducers for data storage and data retrieval to and from the tape 28.

In the storage device 10 of FIG. 1, the lateral position of the magnetic head 16 relative to the tape 28 is controlled by a head-position stepper motor 32, which positions the magnetic head 16 with reference to a head positioning reference point H. The head positioning reference point H is preferably located at the center of the magnetic head, but may be located anywhere on the magnetic head. Data is stored and read from a number of generally parallel longitudinal data tracks extending along the tape. The head-position stepper motor 32 determines which data tracks are aligned with the transducers of the magnetic head. However, the magnetic head having the write transducer-to-read transducer offset may be used in applications in which the magnetic head is stationary and extends across the entirety of the width of the tape 28. In the embodiment of FIG. 3, the drive controller 14 is operated as a peripheral device to a host system 19, such as a computer or workstation. However, this is not critical to the invention.

During read operations, the stepper motor 32 is preferably controlled using conventional servo techniques to precisely position the magnetic head 16. For example, there may be one read head that is dedicated to reading a servo track, so that data from the read head is processed to determine the relative position of the read head to the servo track. The centerline of this dedicated read head may be considered to be a track-following plane. With regard to the present invention, the track-following plane is along the head positioning reference point H. If there are two read heads dedicated to reading different servo tracks, the track-following plane (and therefore the reference point H) is at the center of the two centerlines of the dedicated read heads.

Figure 4:
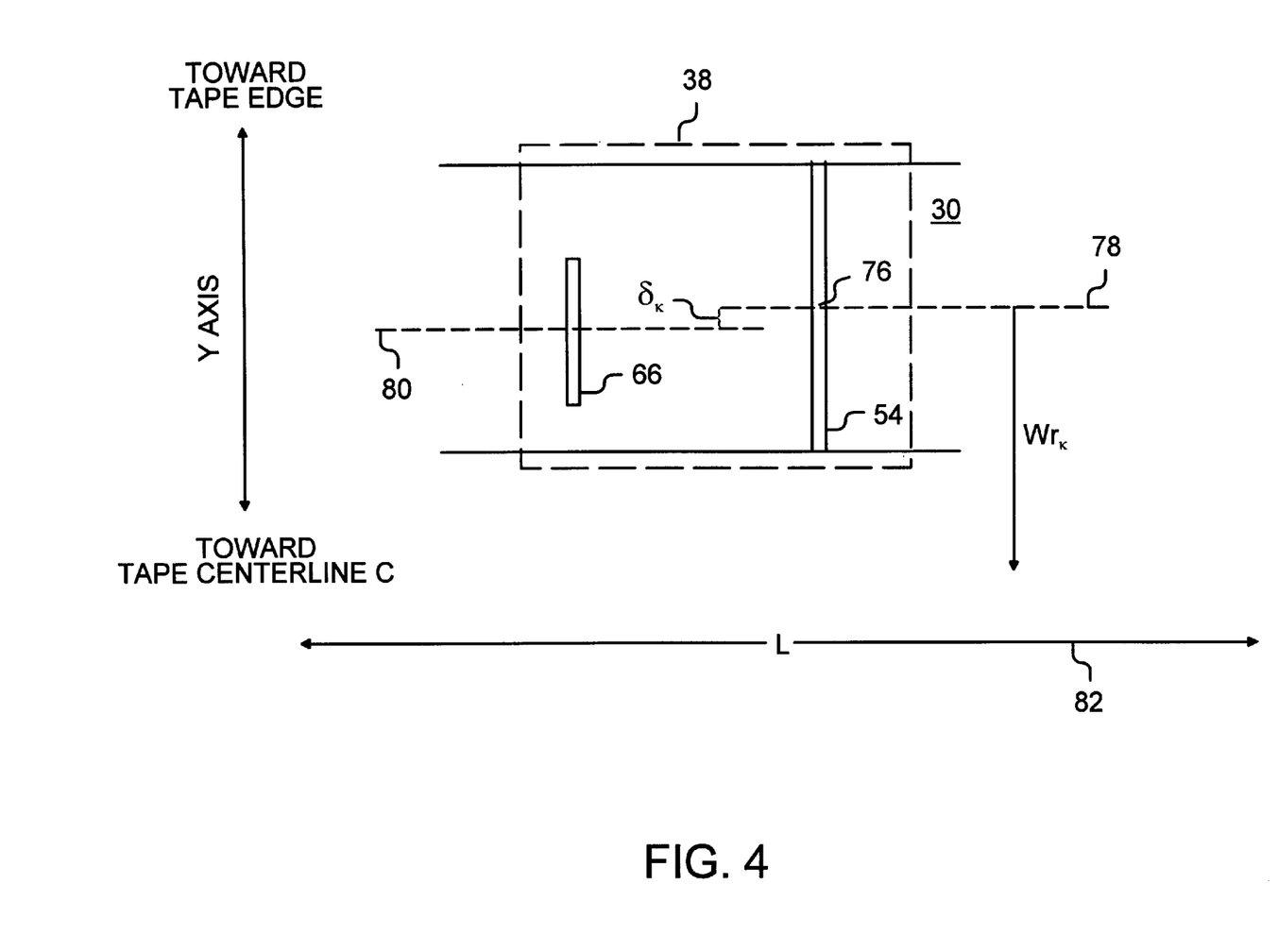
FIG. 4 is a side view of a transducer pair adjacent to a single data track, with read and write transducers positioned relative to each other in accordance with the invention.
Figure 5:
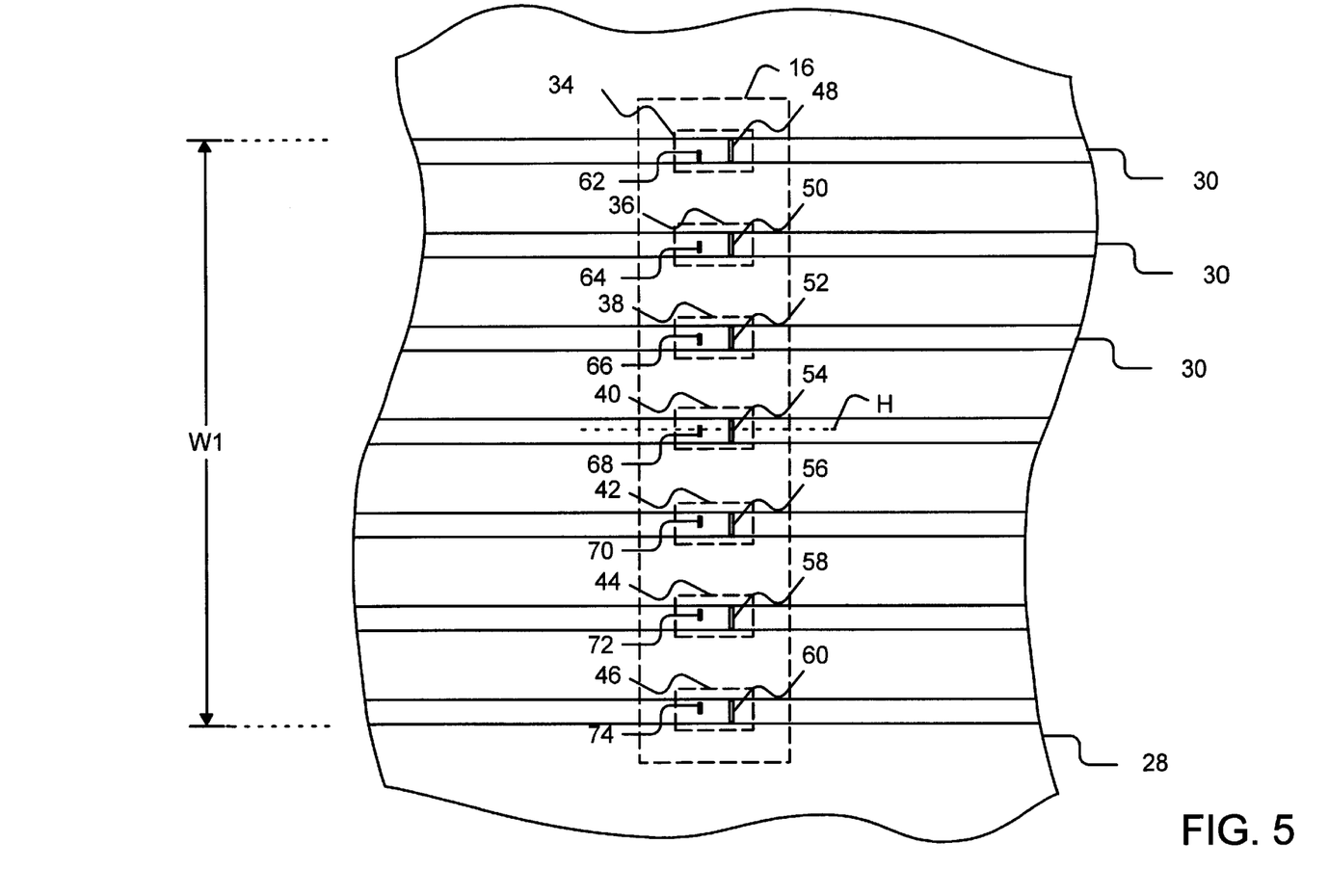
FIG. 5 is a side view of a first embodiment of a multi-transducer magnetic head in accordance with the invention.

Referring now to FIGS. 4 and 5, the magnetic head 16 is shown as extending across a portion of the width of the magnetic tape 28. The width of the portion is shown in FIG. 5 as W1, representing the width prior to shrinkage. An array of transducer pairs 34, 36, 38, 40, 42, 44 and 46 are arranged along the length of the magnetic head. The number of transducer pairs and the dimensions of the magnetic head are not critical to the invention. Each of the transducer pairs is aligned with a data track 30. During tape movement along a magnetic tape path, the magnetic head is in contact or near contact with the tape and the transducer pairs are used to store or retrieve data on the tracks 30. The head positioning reference point H is shown located at the center of the magnetic head, which corresponds with the centerline of the center transducer pair 40. Thus, the center transducer pair may be dedicated to servo positioning of the head, or the outermost pairs 34 and 46 may be dedicated so that the track-following plane is along the center of the two pairs. However, it is not critical that the track-following plane be at the center of the magnetic head. A single outermost transducer pair, e.g., pair 46, may define the track-following plane, and therefore the head positioning reference point H.

Each transducer pair 34–46 includes at least one write transducer 48, 50, 52, 54, 56, 58 and 60 and includes at least one read transducer 62, 64, 66, 68, 70, 72 and 74. In the embodiment of FIG. 5, the tape 28 must travel from right to left during write operations, if the read heads 62–74 are to be used to simultaneously verify the recording of data by the write heads 48–60.

Optionally, the magnetic head 16 is controlled by the head-position stepper motor 32 of FIG. 3, so that data can be written and read in the region between the data tracks 30 of FIG. 5. Thus, additional data tracks may be formed by laterally displacing the magnetic head parallel to the width of the tape 28. Separate electronic channels to the individual write transducers 48–60 and the individual read transducers 62–74 permit control of simultaneous read and write operations.

As previously described with reference to FIGS. 1 and 2, the minimum track width is a factor in determining the maximum data track density. The minimum track width is determined, in part, by the dimensional stability of the magnetic tape 28. It is known in the art to form the read transducers smaller than the write transducers to compensate for a variety of sources of data track misalignment errors, including some age-related shrinkage of the tape 28. However, one basis of the present invention is the recognition of the difference between the age-related sources of alignment errors which begin at a negligible value and increase at a reasonably predictable rate over time ("biased sources") and other sources of transducer-to-rack alignment errors, which can be generally described as distributed in a probability curve about a mean value that is typically near zero ("non-biased sources"), and compensating for the biased sources of error differently than the non-biased sources of error. It is a benefit of the invention that, by biasing the read transducer relative to the write transducer to compensate for tape shrinkage rather than increasing the read transducer margins, the read transducer may be made wider.

Referring now to FIG. 4, the transducer pair 38 is shown in isolation. The write transducer 52 is positioned over a data track 30 that has not been reduced dimensionally as a result of aging. Thus, a centerline 76 through the write transducer is coincident with a centerline 78 through the data track 30. On the other hand, a centerline 80 through the read transducer 66 is offset from the centerlines 76 and 78 by a distance ($\delta_k$). This biases the read transducer from the write transducer centerline 76 towards the head positioning reference point H. The dimension of greatest interest in determining the offset is the distance between the transducer pair and the head positioning reference point H.

In the preferred embodiment, the direction and the distance by which the read transducer centerline 80 is biased from the write transducer centerline 76 is determined as follows: For a particular transducer pair ($\kappa$), the read transducer centerline 80 is biased from the write transducer centerline 76 by a distance ($\delta_\kappa$), which is equal to a percentage (m) of the anticipated fractional change in width of the magnetic tape over the anticipated useful life of the tape, multiplied by the measure of the difference between the distance of the head positioning reference point H from a predetermined reference point P along a Y axis and the distance from the write transducer centerline 76 to the predetermined reference point P. That is, the offset can be calculated for each transducer pair by calculating:

$$\delta_\kappa = m(S)(C - Wr_\kappa)$$

where $\kappa = 1, 2, \ldots N$ and where N is the number of transducer pairs in the array;

S=amount of anticipated change in the width ($\Delta W$) of a magnetic tape over a predetermined useful life of the magnetic tape divided by the original tape width (i.e., $\Delta W/W$);

m=a preselected percentage of compensation;

C=distance to the head positioning reference point H from a predetermined reference point P on the Y axis running perpendicular to the tape path; and $Wr_\kappa$=the distance of the write transducer $\kappa$ from the predetermined reference point P.

In the preferred embodiment of FIG. 5, m=50 percent, and both the predetermined reference point P and the head positioning reference point H are located at the center of the magnetic head. Thus, in the preferred embodiment, the calculation is reduced to:

$$\delta_\kappa = \tfrac{1}{2}(S)(-Wr).$$

Because multi-transducer magnetic heads are currently manufactured in large numbers of silicon wafers in a manner similar to fabricating integrated circuit chips, it is sometimes convenient to use the reference point P which lies outside of the magnetic head for calculation of the offset.

Referring to FIGS. 4 and 5, the result of positioning the read transducers 62–74 as described above is that the pitch between centerlines of the read transducers and the pitch between centerlines of the write transducers 48–60 remains constant, however, the pitch between the centerline of the read transducer and the centerline of the write transducer in each transducer pair ($\kappa$) increases with the distance of the transducer pair ($\kappa$) from the head positioning reference point H.

Figure 6:
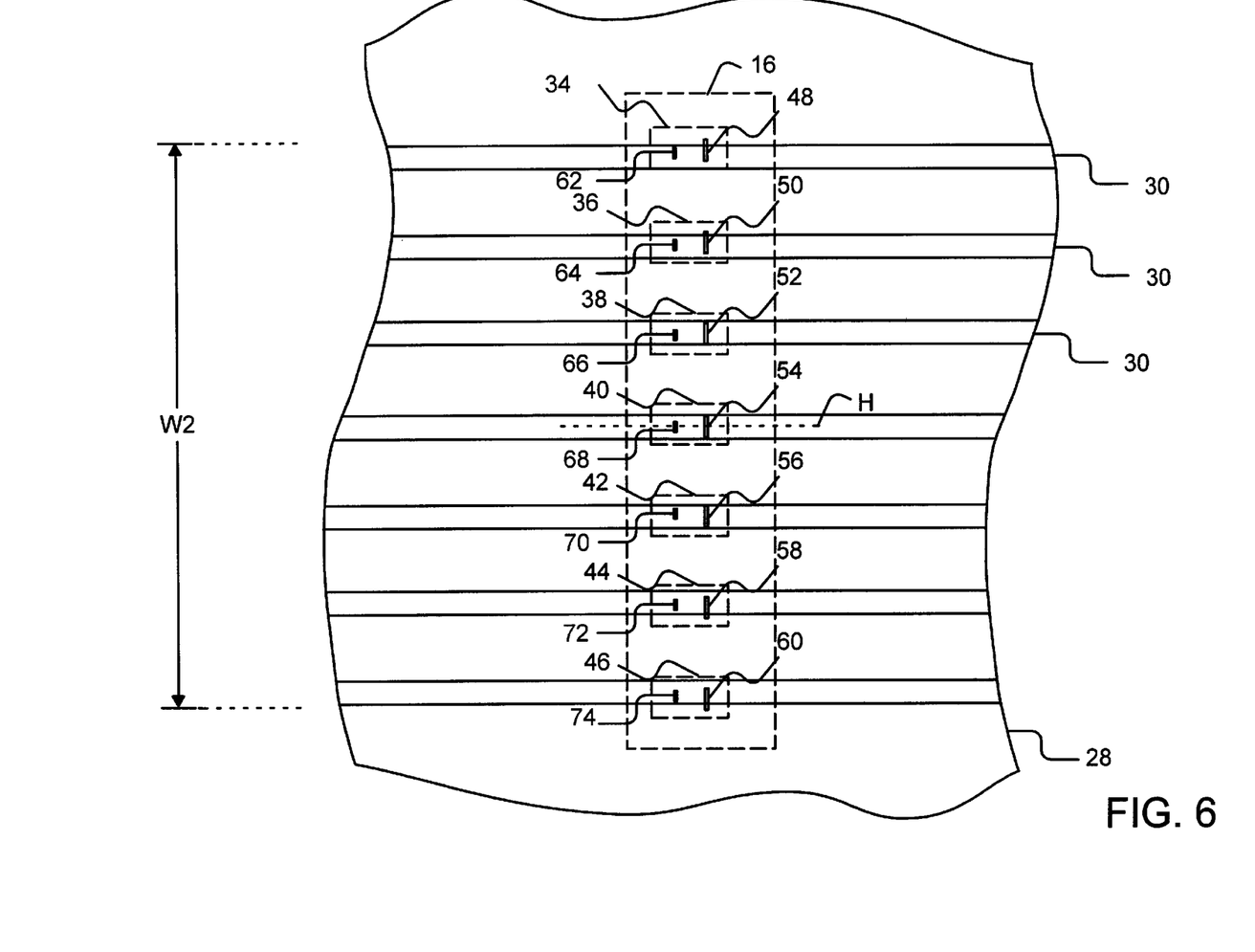
FIG. 6 is a side view of the magnetic head of FIG. 5 adjacent to a magnetic tape having a reduced width as a result of age-related shrinkage.

FIG. 6 illustrates the relative positions of the read transducers 62–74 to the data tracks 30 after the tape 28 has a reduced lateral dimension as a result of aging. The portion of the tape 28 is shown having a width of W2, which is less than the width W1. The outermost read transducers 62 and 74 are now at the outer portions of the associated data tracks, rather than at the inner portions as shown in FIG. 5. However, the outermost read transducers 62 and 74 are still entirely within the associated data tracks. As a result, read signals from the read transducers remain above a threshold signal-to-noise ratio for reliably retrieving data from the data tracks.

Returning to FIG. 4, the implementation of biasing the read transducer 66 relative to the write transducer 52 has been described as moving the read transducer toward the head positioning reference point H by a distance $\delta_\kappa$. In a second embodiment, the write transducers are biased away from the head positioning reference point H. In a third embodiment, the offset $\delta_\kappa$ is divided between biasing the read transducer 66 toward the head positioning reference point H and biasing the write transducer 52 outwardly from the head positioning reference point H. For example, from a position in which the centerline 76 of the write transducer is coincident with the centerline 80 of the read transducer, the read transducer may be biased inwardly by a distance of $\tfrac{1}{2}\delta_\kappa$ and the write transducer may be biased outwardly by a distance of $\tfrac{1}{2}\delta_\kappa$. The value of $\delta_\kappa$ is calculated using the same formula as the first and second embodiments. The concern with the second and third embodiments is that the outward bias of the write heads 52 will result in a lower track density than that which is achieved using the first embodiment. In each case, it is noted that the pitch between the centerlines of adjacent read transducers remains the same, and that the pitch between the centerlines of adjacent write transducers remains the same.

In a fourth embodiment, any of the first three embodiments may be modified by positioning the write transducers 48–60 and the read transducers 62–74 of FIG. 5 at an azimuth angle, rather than parallel, to the width of the tape 28. It is well known in the art to position a magnetic head 16 at a chosen azimuth angle and to position a read transducer relative to a write transducer on the magnetic head so that the read transducer centerline is aligned with the write transducer centerline when the magnetic head is at the correct azimuth angle. In this embodiment, the distance by which the read transducers are biased toward the center of the magnetic head is the product of $\delta_\kappa$ (as calculated above) and cosine $\theta$, where $\theta$ is the angle of azimuth of the magnetic head.

In any of the embodiments described above, a first step in carrying out the invention is to select the lengths of the write transducers and the read transducers. Typically, the read transducers have a length that is less than that of the write transducers. The sources of transducer-to-track alignment errors are divided into biased sources and non-biased sources. Preferred margins are calculated for the read transducers and the write transducers to at least partially compensate for the non-biased sources of tracking error. It is possible that the configuration of transducers as shown in FIG. 1 may reflect the preferred margins of transducer positioning.

In a next step, the biased sources of alignment errors are then considered, particularly age-related shrinkage. Compensation is at least partially provided by adjusting the position of the read transducer relative to the write transducer, in each transducer pair based upon the distances of the transducer pairs from the head positioning reference point H. The reference point H is preferably along the track-following plane defined by operation of a servo mechanism. The offset between the centerline of the read transducer and the centerline of the write transducer increases with distance of the centerlines from the head positioning reference point. The implementation of the varying offsets may be provided using any of the embodiments described above.

Biasing the relative positions of the read transducers 62–74 and/or the write transducers 48–60 creates a small initial loss of tolerance for non-biased sources of transducer-to-track error prior to any tape shrinkage. However, a long-term gain is achieved with respect to tolerance to shrinkage of the tape due to aging. Furthermore, the tolerance to non-biased sources of alignment error increases as the tape shrinks, from a starting tolerance when the tape is new to a maximum tolerance when the tape has reached m of the anticipated shrinkage.

The invention has been described and illustrated as focusing upon shrinkage of the tape due to aging. However, the biasing of the transducers may also be used to compensate for any source of misalignment error which can be considered to have a negligible starting value which deviates from that starting value in a single direction over time.

What is claimed is:

1. A transducer arrangement for writing and reading data on a plurality of data tracks of a magnetic tape progressing along a magnetic tape path, said transducer arrangement comprising:

an array of transducer pairs positioned in a widthwise direction across at least a portion of a width of said magnetic tape path, each transducer pair having a write transducer and a read transducer dedicated to writing and reading data on a particular data track, said write transducers being on a same side of said read transducers within said array, said write and read transducers having orientations such that first centerlines through said write transducers are generally parallel to second centerlines through said read transducers, distances between said first and second centerlines within transducer pairs being greater with distance of said transducer pairs from a first reference point for positioning said array relative to said magnetic tape; and a magnetic head extending across at least said portion of said magnetic tape path in a direction perpendicular to said magnetic tape path, said array being fixed to said magnetic head, said first reference point being located at a center of the magnetic head, said distances between said first and second centerlines within said transducer pairs thereby increasing with distance of said transducer pairs from said center, wherein a center transducer pair of said array is located at said first reference point, said first and second centerlines of said center transducer pair being coincident.

2. The transducer arrangement of claim 1 wherein said magnetic head is laterally displaceable in said direction perpendicular to said magnetic tape path and is responsive to a servo mechanism that determines lateral displacement, said first reference point being located along the magnetic head and being based upon operation of said servo mechanism.

3. The transducer arrangement of claim 1 wherein said first centerlines through said write transducers have a first pitch and wherein said second centerlines through said read transducers have a second pitch that is less than said first pitch.

4. A method of determining positions of transducers in a magnetic head arrangement for writing and reading data in tracks of a magnetic tape, said magnetic head having an array of transducer pairs, each transducer pair having a write transducer and a read transducer, said method comprising the steps of:

(a) dividing sources of transducer-to-track alignment errors into biased and non-biased sources;

(b) calculating preferred margins for said write and read transducers to at least partially compensate for said non-biased sources of transducer-to-rack alignment errors during write/read operations of said data in said tracks; and (c) at least partially compensating for said biased sources of transducer-to-track alignment errors by adjusting said preferred margins based upon distances of said transducer pairs from a reference plane through said transducer array, including increasing the distance between centerlines through write and read transducers of said transducer pairs with increasing distance from said reference plane through said transducer array.

5. The method of claim 4 further comprising selecting said reference plane based upon servo tracking said magnetic head during read operations of said data in said tracks.

6. The method of claim 4 wherein said step of at least partially compensating for said biased sources includes maintaining a fixed first pitch of said write transducers and a fixed smaller pitch of said read transducers.

7. The method of claims 4 wherein said step of at least partially compensating for said biased sources includes offsetting said distance ($\delta_\kappa$) between centerlines through said read and write transducers of each transducer pair ($\kappa$) based upon the calculation:

$$\delta_\kappa = (m)(S)(C - Wr_\kappa)$$

where:

m=a preselected value less than one;

S=an anticipated fractional change of width of said magnetic tape over a predetermined useful life of said magnetic tape;

C=distance between said reference plane H and a parallel reference plane P; and $Wr_\kappa$=distance between a centerline of said write transducer of said transducer pair $\kappa$ and said parallel reference plane P.

8. A multi-track magnetic tape data storage device comprising:

positioning means for positioning magnetic tape having a plurality of substantially parallel data tracks positioned laterally along a width of said tape;

drive means for moving said magnetic tape along a tape path; and a magnetic head extending across at least a portion of said width of said tape, said magnetic head having an array of transducer pairs along a length of said magnetic head, said length of said magnetic head being parallel to said width of said tape, each transducer pair having a read transducer with a center and a read centerline passing therethrough and having a write transducer with a center and a write centerline passing therethrough, said read centerline and said write centerline being substantially parallel to each other, and wherein a first pitch between adjacent read centerlines is less than a second pitch between adjacent write centerlines.

9. The device of claim 8 wherein each said read centerline of each read transducer is biased along a Y axis running substantially perpendicular to said tape path, with said bias being relative to said centerline of the write transducer within a same transducer pair as said each read transducer, said bias being an offset by a selected distance ($\delta_\kappa$) which is calculated as follows:

$$(\delta_\kappa) = \tfrac{1}{2}(S)(C - Wr_\kappa)$$

where:

$\kappa$=1 through N, where N is the number of transducer pairs on said magnetic head;

S=anticipated change in width of said magnetic tape over a predetermined useful life of said magnetic tape divided by the width of said magnetic tape;

$Wr_\kappa$=distance of said write transducer number $\kappa$ from a predetermined reference point P on the Y axis; and C=distance of a head reference plane H from said predetermined reference point P on the Y axis.

10. The device of claim 9 wherein said magnetic head has a center and wherein said head reference plane H is located at said center of the magnetic head.

11. The device of claim 9 further comprising a servo means for laterally displacing said magnetic head such that a particular region of said magnetic head tracks a widthwise position along said tape, said particular region being generally coincident with said head reference plane H.

12. A transducer arrangement for writing and reading data on a plurality of data tracks of a magnetic tape progressing along a magnetic tape path, said transducer arrangement comprising:

an array of transducer pairs positioned in a widthwise direction across at least a portion of a width of said magnetic tape path, each transducer pair having a write transducer and a read transducer dedicated to writing and reading data on a particular data track, said write transducers being on a same side of said read transducers within said array, said write and read transducers having orientations such that first centerlines through said write transducers are generally parallel to second centerlines through said read transducers, distances between said first and second centerlines within transducer pairs being greater with distance of said transducer pairs from a first reference point for positioning said array relative to said magnetic tape;

wherein for each of said transducer pairs, said distance between said first and second centerlines is a selected distance ($\delta_\kappa$) based upon compensating for a fixed percentage (m) of an amount (S) of anticipated change in a magnetic tape width over a predetermined useful life of the magnetic tape divided by an original magnetic tape width, said selected distance being calculated as follows:

$$\delta_\kappa = m(S)(C - Wr_\kappa)$$

where:

$\kappa = 1, 2, \ldots N$ and where N is the number of transducer pairs in the array;

$Wr_\kappa$=the distance of the write transducer $\kappa$ from a predetermined second reference point P on a Y axis that extends perpendicular to said magnetic tape path; and C=the distance of said first reference point from said predetermined second reference point P on said Y axis.

13. The transducer arrangement of claim 12 wherein m=50 percent and said predetermined second reference point P is located substantially at said first reference point such that said calculation is reduced to $\delta_\kappa = \frac{1}{2}(S)(-Wr_\kappa)$.

* * * * *